L. FURNARI.
SPADING MACHINE.
APPLICATION FILED JULY 6, 1920.
1,374,195.
Patented Apr. 12, 1921.
3 SHEETS—SHEET 3.
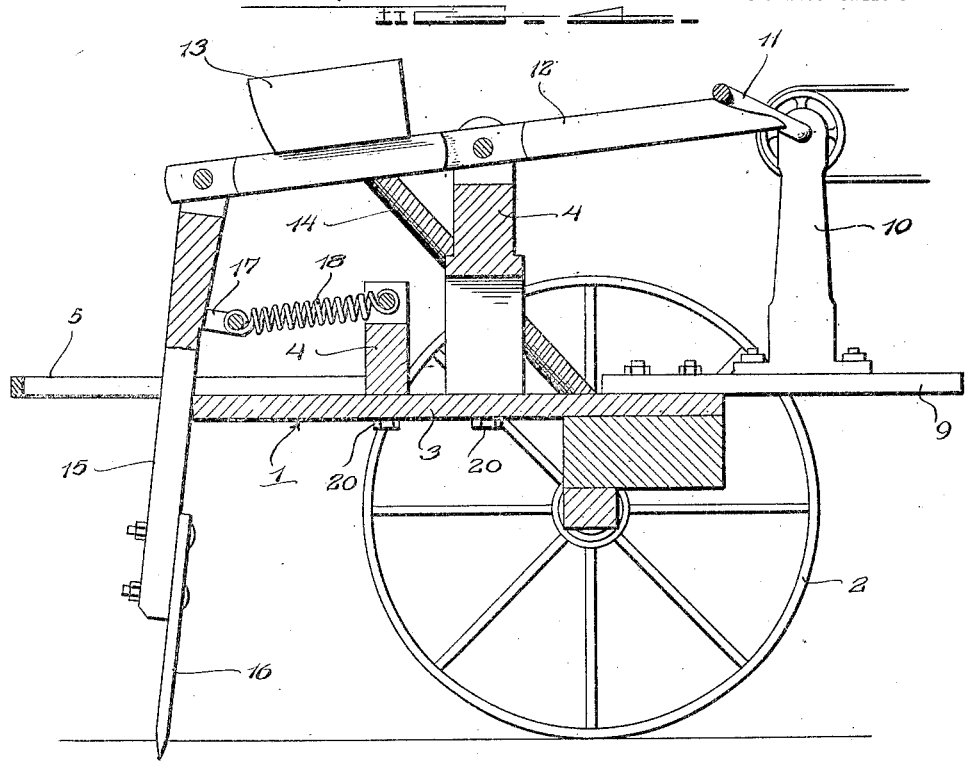
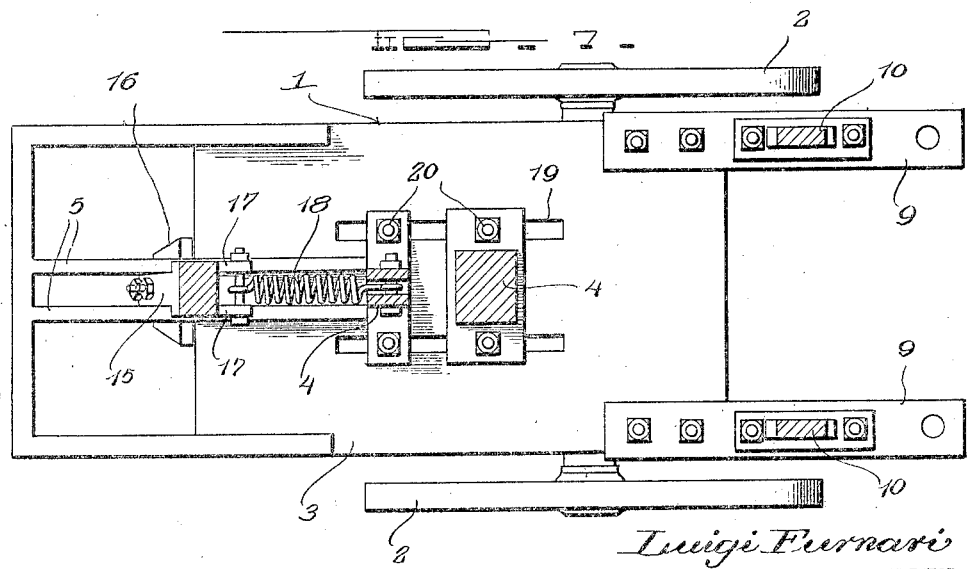

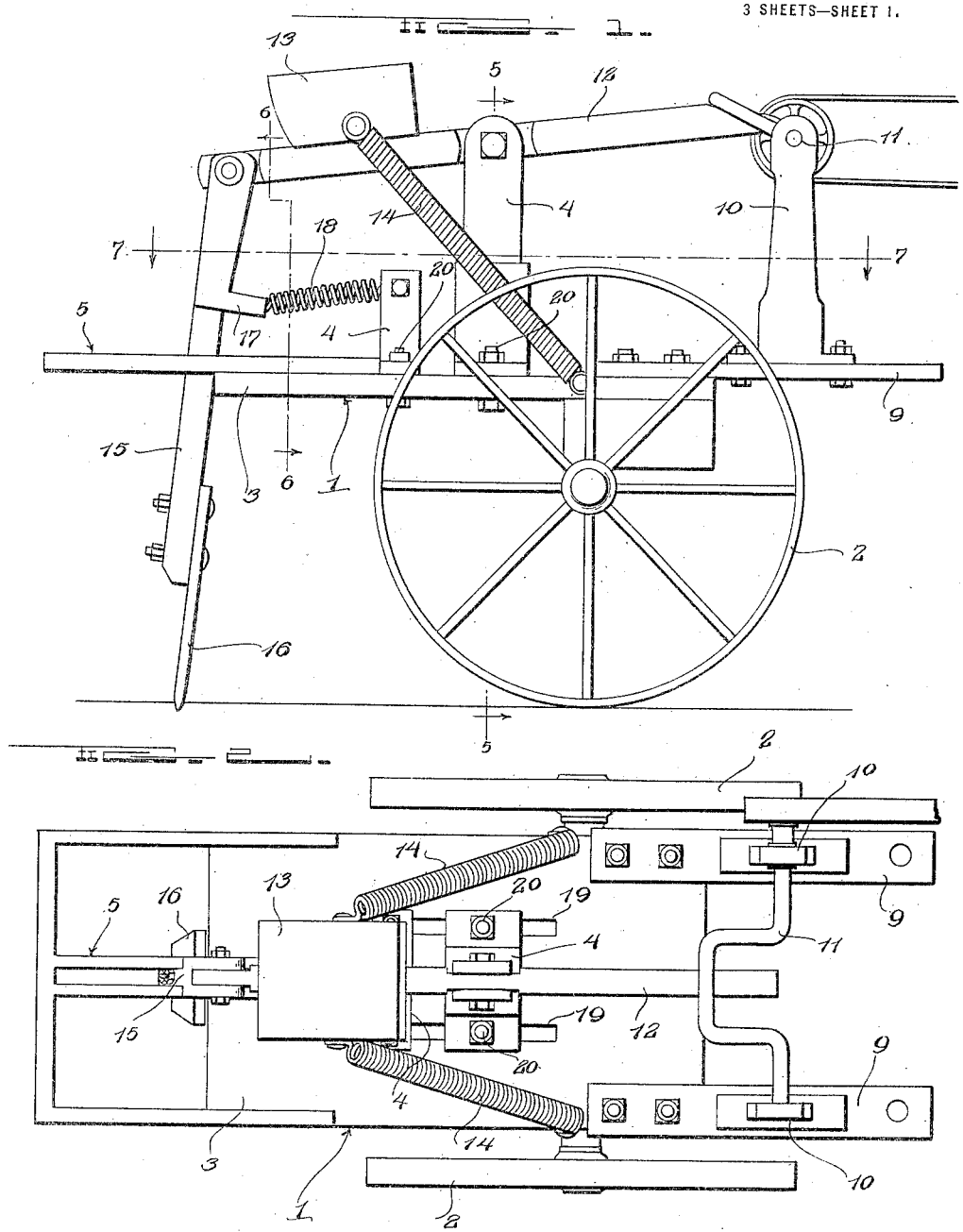

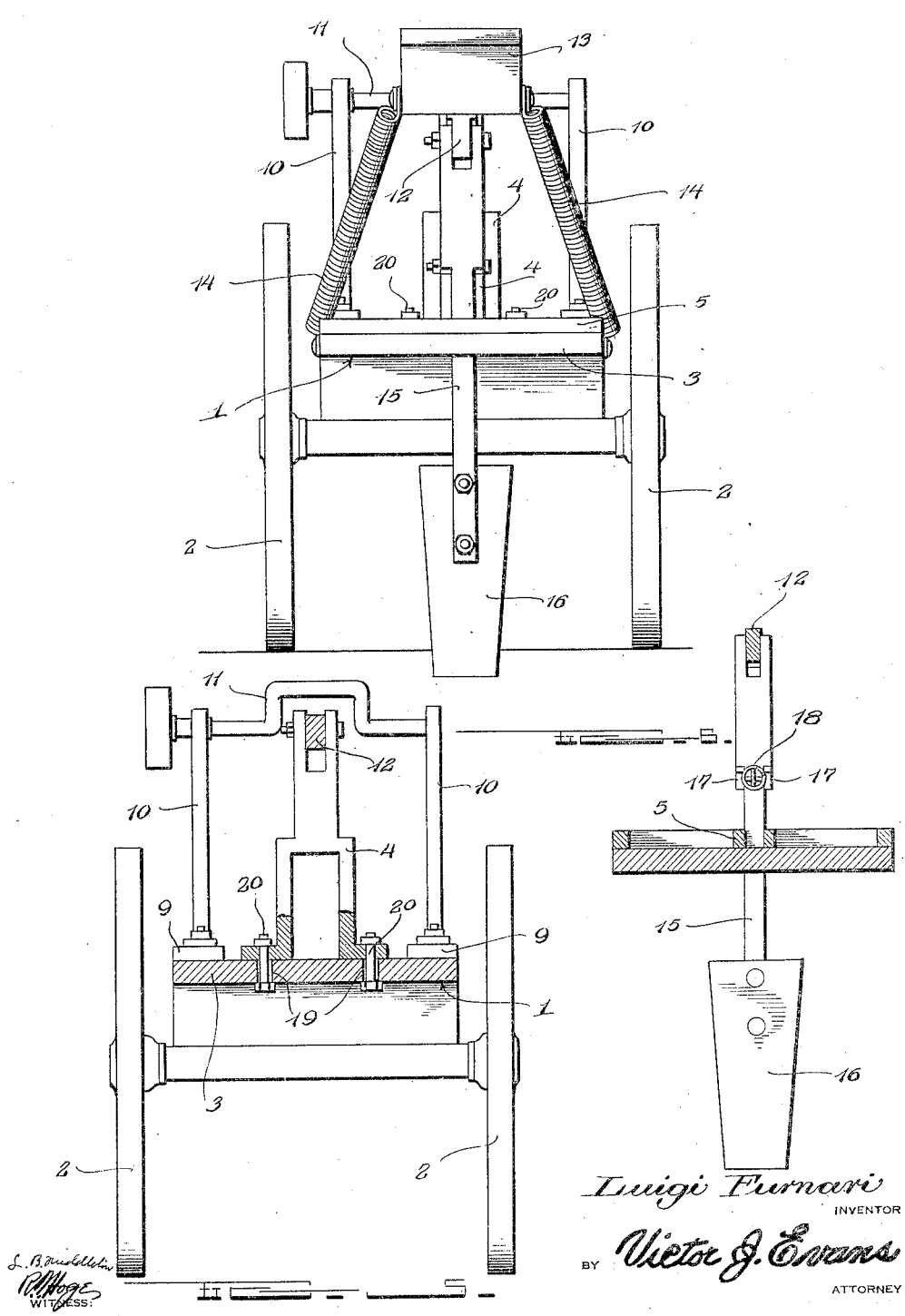

UNITED STATES PATENT OFFICE.

LUIGI FURNARI, OF RAVENNA, OHIO.

SPADING-MACHINE.

1,374,195.   Specification of Letters Patent.   Patented Apr. 12, 1921.

Application filed July 6, 1920. Serial No. 394,179.

*To all whom it may concern:*

Be it known that I, LUIGI FURNARI, subject of the King of Italy, residing at Ravenna, in the county of Portage and State of Ohio, have invented new and useful Improvements in Spading-Machines, of which the following is a specification.

This invention relates to an agricultural implement, the principal object of the invention being to provide an apparatus for spading the soil so as to break up the same.

Another object of the invention is to provide means for reciprocating the spade carrying member so as to alternately drive the spade into the ground and withdraw it from the ground with means for giving the spade a kick at the end of its downward movement to throw the soil away from the spade.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the invention.
Fig. 2 is a plan view.
Fig. 3 is a rear view.
Fig. 4 is a longitudinal section.
Fig. 5 is a section on line 5—5 of Fig. 1.
Fig. 6 is a section on line 6—6 of Fig. 1.
Fig. 7 is a horizontal section on line 7—7 of Fig. 1.

In these views, 1 indicates the supporting frame which is carried by the wheels 2. This frame includes the platform 3 having the uprights 4 thereon, the spaced guiding bars 5 projecting from one end of the frame and the arms 9 for connecting the frame to the tractor or another implement. The arms 9 carry the uprights 10 in which is journaled the crank shaft 11. This shaft may be connected with a motor located on the other vehicle or it may be driven from one of the wheels 2 or from one of the wheels of the tractor. A walking beam 12 is pivoted intermediate its ends to the upper forked end of one of the uprights 4 and the inner end of this beam has a beveled upper face which is adapted to be struck by the crank of the shaft 11 so that this end of the beam will be lowered by the crank. A weight 13 is secured to the outer part of the beam for lowering this end of the beam as soon as the other end is free of the crank and I also provide a pair of springs 14 which have their ends attached to said weight and to a part of the platform for helping the weight to lower the outer end of the beam. This outer end of the beam is pivotally connected to the upper forked end of the spade carrying member 15 which carries the spade 16 at its lower end. This member passes between the guiding bars 5 so as to be guided thereby in its reciprocating movement. The spade is bolted to said member so that it may be removed when worn or broken and replaced by a new one. The upper part of the member 15 carries a pair of arms 17 and the coil spring 18 has one end connected to the ends of these arms by a bolt or the like. The other end of said spring is connected with the upper end of the other upright 4. This spring tends to hold the spade carrying member against the end edge of the platform and when the spade carrying member nears the end of its downward movement this spring will pull the upper end of said member inwardly and force its lower end outwardly thus giving the spade a rearward kick to throw the dirt away from the same.

I adjustably mount the uprights 4 on the platform by providing slots 19 in said platform to receive the bolts 20, which bolt the uprights thereto. By adjusting these uprights the kick given to the spade can be regulated to suit the conditions of the soil.

It will thus be seen that as the crank shaft revolves the beam 12 will be rocked and the spade carrying member reciprocated. As the spade carrying member is reciprocated the spring 18 will hold it against the edge of the platform, but as soon as it nears the end of its downward movement and the spade is out of contact the upper end of the member is jerked inwardly so as to give a kick to its outer end to throw the dirt away from the spade. Thus the soil is thoroughly broken up and pulverized.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described comprising a wheeled frame, a pair of uprights adjustably supported thereon, a walking beam carried by one upright, a spade carrying member pivoted to the outer end of said walking beam, a spring connecting the upper part of said spade carrying member with the other upright, spaced guiding bars for guiding said spade carrying member and means for actuating the walking beam.

2. An apparatus of the class described comprising a wheeled frame, a pair of uprights adjustably supported thereon, a walking beam carried by one upright, a spade carrying member pivoted to the outer end of said walking beam, a spring connecting the upper part of said spade carrying member with the other upright, spaced guiding bars for guiding said spade carrying member and means for actuating the walking beam, such means consisting of a crank shaft for engaging one end of the beam and springs and a weight connected with the other end.

In testimony whereof I affix my signature.

LUIGI FURNARI.